US009389105B2

(12) United States Patent
Farahi et al.

(10) Patent No.: US 9,389,105 B2
(45) Date of Patent: Jul. 12, 2016

(54) DISTRIBUTED SENSOR GRID, SURFACE, AND SKIN SYSTEMS AND METHODS

(71) Applicants: Faramarz Farahi, Charlotte, NC (US); Mehrdad Abolbashari, Charlotte, NC (US)

(72) Inventors: Faramarz Farahi, Charlotte, NC (US); Mehrdad Abolbashari, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 349 days.

(21) Appl. No.: 13/922,364

(22) Filed: Jun. 20, 2013

(65) Prior Publication Data
US 2013/0340543 A1 Dec. 26, 2013

Related U.S. Application Data

(60) Provisional application No. 61/662,450, filed on Jun. 21, 2012.

(51) Int. Cl.
*G01D 21/02* (2006.01)
*H04N 5/378* (2011.01)
*G01D 21/00* (2006.01)
*H04N 5/335* (2011.01)
*H04N 5/341* (2011.01)

(52) U.S. Cl.
CPC ............... *G01D 21/00* (2013.01); *H04N 5/335* (2013.01); *H04N 5/341* (2013.01); *H04N 5/378* (2013.01)

(58) Field of Classification Search
CPC ....... G01D 21/00; H04N 5/335; H04N 5/341; H04N 5/378

USPC ............................... 73/866; 250/208; 348/295
See application file for complete search history.

(56) References Cited

U.S. PATENT DOCUMENTS

| 6,323,846 | B1 * | 11/2001 | Westerman | G06F 3/0235 345/173 |
|---|---|---|---|---|
| 8,853,608 | B2 * | 10/2014 | Cho | H01L 27/14609 250/208.1 |
| 2001/0052864 | A1 * | 12/2001 | Shimizu et al. | 341/141 |
| 2007/0296965 | A1 * | 12/2007 | Brady | G01J 3/02 356/310 |
| 2008/0062140 | A1 * | 3/2008 | Hotelling | G09G 3/3648 345/173 |
| 2009/0273573 | A1 * | 11/2009 | Hotelling | G06F 3/0362 345/173 |
| 2010/0253941 | A1 * | 10/2010 | Brady | G01J 3/02 356/310 |
| 2011/0050585 | A1 * | 3/2011 | Hotelling | G06F 3/044 345/173 |
| 2011/0187677 | A1 * | 8/2011 | Hotelling | G06F 3/0412 345/174 |

* cited by examiner

*Primary Examiner* — John Fitzgerald
*Assistant Examiner* — Gedeon M Kidanu
(74) *Attorney, Agent, or Firm* — Clements Bernard PLLC; Christopher L. Bernard; Lawrence A. Baratta, Jr.

(57) ABSTRACT

The present disclosure provides distributed sensor grid, surface, and skin systems and methods that utilize compressive sampling systems and methods for reading and processing the outputs of sensor arrays (serial and/or parallel) such that increased speed can be achieved. These sensor arrays can be functionalized or sensitized in any desired manner and functions are derived from the outputs, as opposed to individual data points. The sensor arrays can be made in the form of a textile, a fiber optic network, a MEMS network, or a CMOS camera, for example. In general, in accordance with the systems and methods of the present disclosure, a Code is applied to a distributed sensor as part of the compressive sampling technique and derives the functions.

20 Claims, 9 Drawing Sheets

A (a)     (b)     (c)     (d)

(e)     (f)     (g)

A (a)  (b)  (c)

A (a)

(c)

(b)

DISTRIBUTED SENSOR GRID, SURFACE, AND SKIN SYSTEMS AND METHODS

CROSS-REFERENCE TO RELATED APPLICATION

The present patent application/patent claims the benefit of priority of U.S. Provisional Patent Application No. 61/662,450, filed on Jun. 21, 2012, and entitled "SENSING GRIDS AND SENSITIVE SKINS," the contents of which are incorporated in full by reference herein.

FIELD OF THE DISCLOSURE

The present disclosure relates generally to distributed sensor grid, surface, and skin systems and methods. More specifically, the present disclosure relates to compressive sampling systems and methods for reading and processing the outputs of sensor arrays (serial and/or parallel) such that increased speed can be achieved. These sensor arrays can be functionalized or sensitized in any desired manner and functions are derived from the outputs, as opposed to individual data points. The sensor arrays can be made in the form of a textile, a fiber optic network, a MEMS network, or a CMOS camera, for example.

BACKGROUND OF THE DISCLOSURE

Sensor arrays typically include a plurality of units, or pixels, arranged either serially or in a grid or matrix. These sensor arrays can be functionalized or sensitized to sense a virtually limitless variety of inputs, such as light, pressure, strain, electrical signals, temperature, biologics, etc. Typically, the output of each pixel is read as a data point and the results are interpreted to evaluate the parameter of interest. This can be a processing intensive and time consuming process, especially when real time sensing is desired, such as for providing a responsive action. Examples of such functionality include photo sensors, cameras, touch screens, biologic sensors, etc.

Thus, what are still needed in the art are sensor arrays that are simple to manufacture, flexible in their physical applications, and that can be read out quickly and efficiently, without sacrificing accuracy. This is what is provided by the distributed sensor grid, surface, and skin systems and methods of the present disclosure.

BRIEF SUMMARY OF THE DISCLOSURE

In various exemplary embodiments, the present disclosure provides distributed sensor grid, surface, and skin systems and methods that utilize compressive sampling systems and methods for reading and processing the outputs of sensor arrays (serial and/or parallel) such that increased speed can be achieved. These sensor arrays can be functionalized or sensitized in any desired manner and functions are derived from the outputs, as opposed to individual data points. The sensor arrays can be made in the form of a textile, a fiber optic network, a MEMS network, or a CMOS camera, for example.

In one exemplary embodiment, the present disclosure provides a distributed sensor system, including: a distributed sensor array including a plurality of sensor units and one or more outputs; and one or more Codes applied to the plurality of sensor units; wherein the one or more Codes provide one or more functions that are read out at the one or more outputs, thereby allowing for the compressive sampling of the plurality of sensor units. The distributed sensor array includes one of a linear sensor array, a sensor grid, and a sensor matrix. Optionally, the distributed sensor array makes up one of a sensor surface, a sensor fabric, and a sensor skin. Optionally, the distributed sensor array is manufactured using one of a fiber optic manufacturing technique, a textile fabric manufacturing technique, a photodiode fabrication technique, and a micro-electromechanical system manufacturing technique, for example. The distributed sensor array can be used in conjunction with any sensor technology or combination of sensor technologies. The distributed sensor array can include one or more Single Output Distributed Sensor(s). The distributed sensor array can also include one or more Multiple Output Distributed Sensor(s). Each of the plurality of sensor units is one of configured and functionalized to sense a parameter of interest. Each of the one or more Codes includes one of a random Code, a pseudo random Code, and a predetermined Code that is optimized for a given plurality of sensor units. The one or more outputs are read one of serially and in parallel. The parameter of interest includes one or more of light intensity, pressure, strain, electrical signals, temperature, biologics, etc.

In another exemplary embodiment, the present disclosure provides a distributed sensor method, including: providing a distributed sensor array including a plurality of sensor units and one or more outputs; and applying one or more Codes to the plurality of sensor units; wherein the one or more Codes provide one or more functions that are read out at the one or more outputs, thereby allowing for the compressive sampling of the plurality of sensor units. Again, the distributed sensor array includes one of a linear sensor array, a sensor grid, and a sensor matrix. Optionally, the distributed sensor array makes up one of a sensor surface, a sensor fabric, and a sensor skin. Optionally, the distributed sensor array is manufactured using one of a fiber optic manufacturing technique, a textile fabric manufacturing technique, a photodiode fabrication technique, and a micro-electromechanical system manufacturing technique, for example. The distributed sensor array can be used in conjunction with any sensor technology or combination of sensor technologies. The distributed sensor array can include one or more Single Output Distributed Sensor(s). The distributed sensor array can also include one or more Multiple Output Distributed Sensor(s). Each of the plurality of sensor units is one of configured and functionalized to sense a parameter of interest. Each of the one or more Codes includes one of a random Code, a pseudo random Code, and a predetermined Code that is optimized for a given plurality of sensor units. The one or more outputs are read one of serially and in parallel. The parameter of interest includes one or more of light intensity, pressure, strain, electrical signals, temperature, biologics, etc.

In a further exemplary embodiment, the present disclosure provides a distributed imaging system, including: a distributed sensor array including a plurality of sensor units and one or more outputs, wherein each of the plurality of sensor units is one of configured and functionalized to sense radiation; and one or more Codes applied to the plurality of sensor units; wherein the one or more Codes provide one or more functions that are read out at the one or more outputs, thereby allowing for the compressive sampling of the plurality of sensor units. Optionally, each of the one or more Codes includes a radiation mask. Optionally, the radiation is visible radiation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
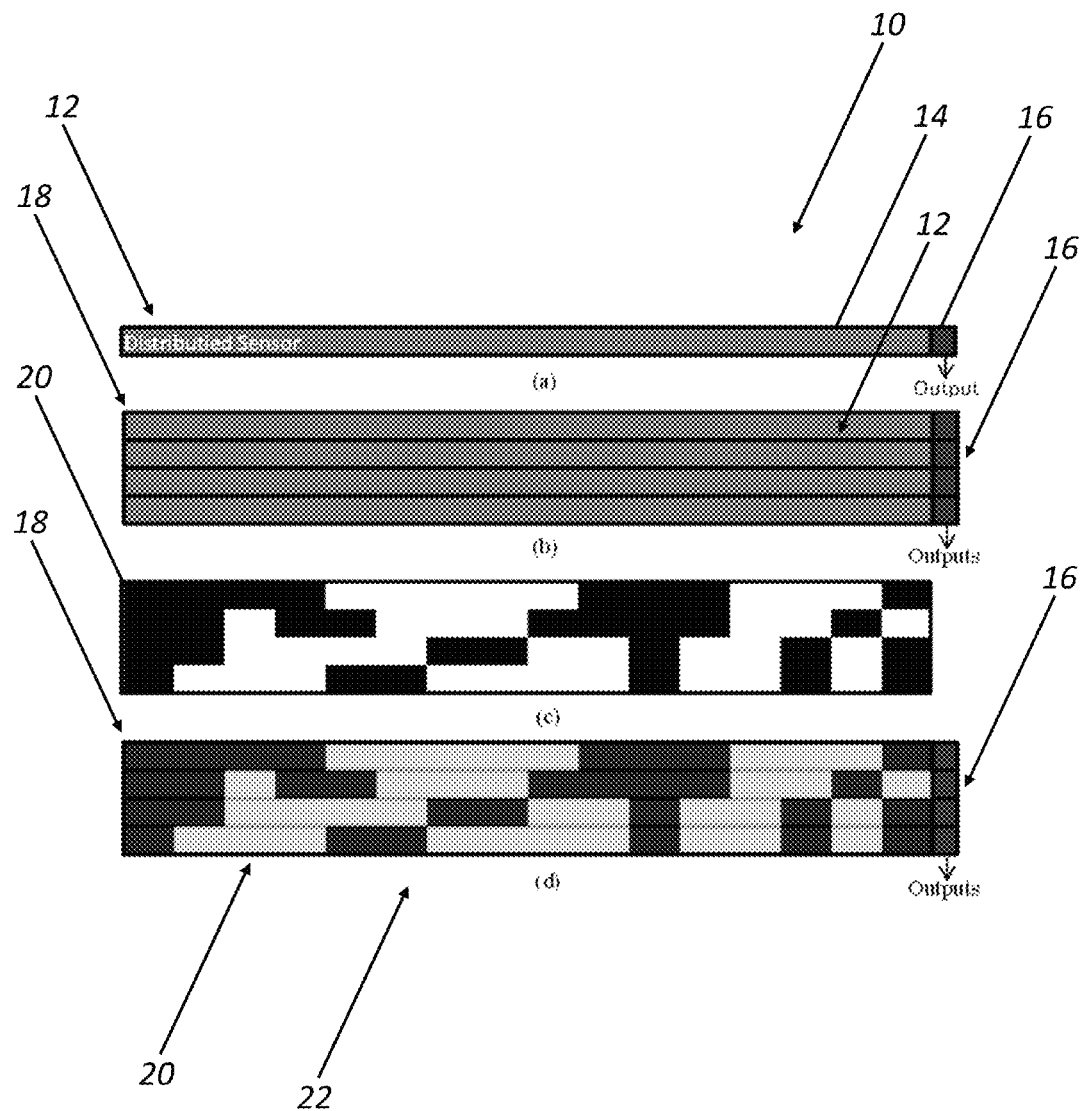
FIG. 1 is a series of schematic diagrams illustrating: (a) a Single Output Distributed Sensor (SODiS); (b) a Bundled 4-SODiS; (c) a 4×16 Code; and (d) a Coded Bundled 4-SO-DiS, in accordance with the systems and methods of the present disclosure.

Again, in various exemplary embodiments, the present disclosure provides distributed sensor grid, surface, and skin systems and methods that utilize compressive sampling systems and methods for reading and processing the outputs of sensor arrays (serial and/or parallel) such that increased speed and accuracy can be achieved. These sensor arrays can be functionalized or sensitized in any desired manner and functions are derived from the outputs, as opposed to individual data points. The sensor arrays can be manufactured using textile, as well as fiber optic, manufacturing techniques, for example. In general, in accordance with the systems and methods of the present disclosure, a Code is applied to a distributed sensor as part of the compressive sampling technique.

In one exemplary embodiment of the present disclosure, a grid structure allows for the mapping of the distribution of parameters of interest (light intensity, pressure, strain, electrical signals, temperature, biologics, etc.) and includes basic elements. In the aggregate, these basic elements form a distributed sensor (a waveguide, an optical fiber, a piece of wire, a resistance network, a functionalized detector, etc.) with one or more outputs. Each output represents a function (a sum or a partial sum, for example) of the effect of inputs on/to the distributed sensor. This structure is referred to herein as a Single Output Distributed Sensor or SODiS. For example, a fluorescence optical fiber is a waveguide that is sensitive to outside light distribution. The output of such an optical fiber is an optical signal, which is the sum of all of the fluorescence generated along the optical fiber as it is exposed to external light. Such an optical fiber is an example of a Single Output Distributed Sensor (SODiS). If this optical fiber was connected to an optical fiber splitter that had one or more than one input(s) and one or more than one output(s), such a system would be considered a Multiple Output Distributed Sensor (MODiS). Bundling R SODiSes (or MODiSes) provides a distributed sensor with R outputs (or R times the number of outputs of each MODiS). This structure is referred to herein as a Bundled R-SODiS (or R-MODiS). A MODiS with N outputs can be considered to be a combination (i.e., an integration) of N SODiSes.

In accordance with the systems and methods of the present disclosure, a Bundled R-SODiS (or R-MODiS) is used with one or more Code(s) applied on/to it (the Code(s) can be random, pseudo-random, or predetermined and optimized for the specific sensor configuration). Each Code represents a pattern that is a function of the measurements to be taken. For example, for light intensity measurement, a light intensity pattern or mask can be used; that is, the Code can be a pattern of mask that is imposed on the Bundled SODiS that partially (or fully) blocks light in given regions of the Bundled SODiS (i.e., a spatial filter.)

If the Code is R×N, then the resolution of the Bundled R-SODiS is 1×N. This means that each Coded Bundled R-SODiS is considered to be a 1×N array sensor with R outputs.

FIG. 1 is a series of schematic diagrams illustrating the fundamentals of the proposed distributed sensor 10 of the present disclosure. FIG. 1(a) illustrates a SODiS 12 that consists of a distributed sensor 14 and an output 16. FIG. 1(b) illustrates a Bundled 4-SODiS 18 that consists of 4 SODiSes 12; i.e., a distributed sensor with 4 outputs 16. FIG. 1(c) illustrates a 4×16 Code 20 and FIG. 1(d) illustrates a Bundled 4-SODiS 18 with the 4×16 Code 20 applied; thereby forming a Coded Bundled 4-SODiS 22 that has 4 outputs 16 and a pixel resolution of 1×16. Of course, these are exemplary constructs only and should in no way be construed as limiting.

Given a Bundled R-SODiS 18 that is exposed to a distribution of a parameter of interest (for example, an optical image where the parameter of interest is light intensity), it can be used as a sensor to sense the distribution of the parameter of interest and thereby generate a pattern.

In other words, in this example, the sensing grid 18 is sensitive to light intensity and can generate an image like any other camera. The sensing grid can also be used to sense other physical parameters of interest, such as pressure, strain, electrical signals, temperature, biologics, etc., dependent only upon the structure and/or functionalization of the individual sensing elements.

There are various configurations that can be used to acquire a distributed signal (for example, an image) from sensor grid structure 18.

Figure 2:
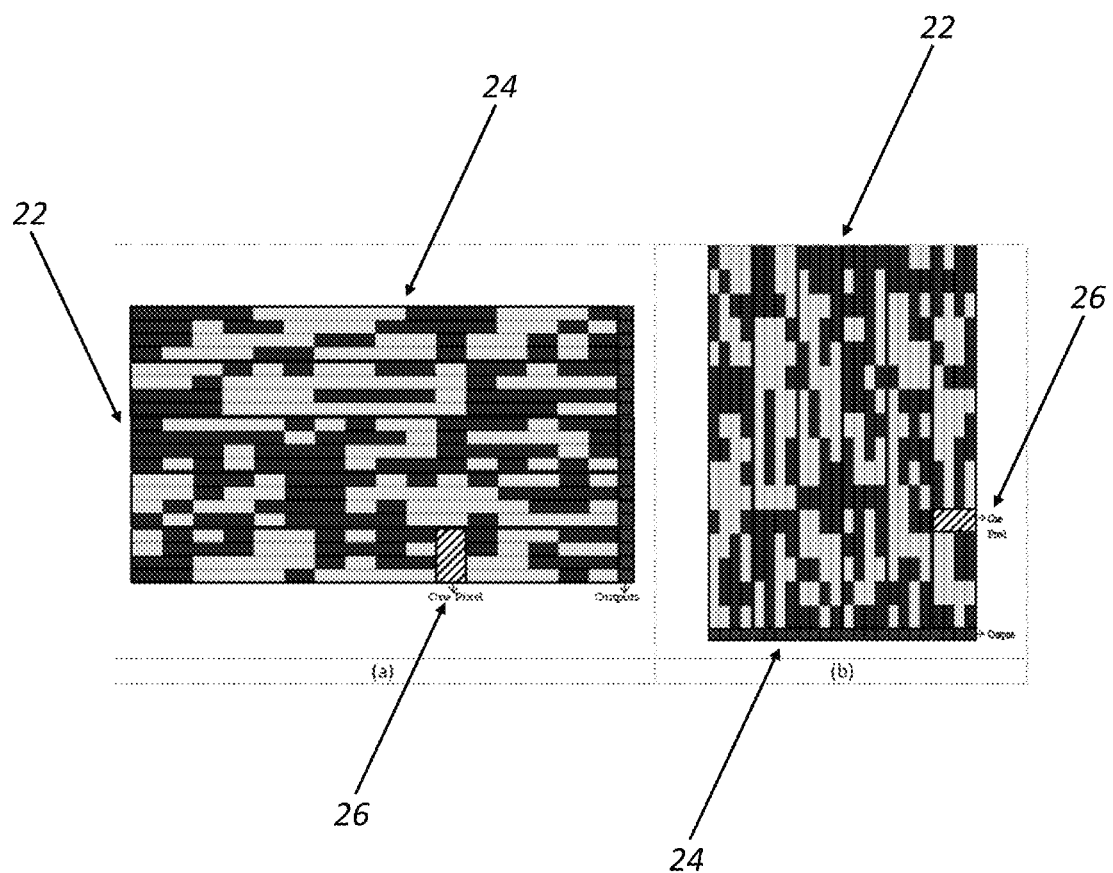
FIG. 2 is a series of schematic diagrams illustrating a grid structure sensor with a horizontal and vertical Coded Bundled SODiS, and (a) a 5-horizontal Coded Bundled 4-SODiS with a 4×16 Code which results in a pixel resolution of 5×16 and 20 outputs and (b) a 6-vertical Coded Bundled 4-SODiS with a 4×16 Code which results in a pixel resolution of 6×16 and 24 outputs, in accordance with the systems and methods of the present disclosure.

M Bundled R-SODiSes 18 can be used next to each other (the Code 20 on each bundle can be different from the other bundles). Therefore, there are M×R SODiSes 18 and each Code 20 has a resolution of R×N. The resultant sensor 24 has M×N pixels and the number of outputs is M×R. If the bundles are horizontal, then the height of each pixel 26 of the sensor 24 is the same as the height of a Bundled R-SODiS 18 and the width of each pixel 26 of the sensor 24 is the same as the height of each element of the Code 20. If the bundles are vertical, then the height of each pixel 26 is the same as the height of each element of the Code 20 and the width of each pixel 26 is the same as the width of each Bundled R-SODiS 18. FIG. 2 illustrates both horizontal and vertical configurations of Coded Bundled SODiSes 24.

Figure 3:
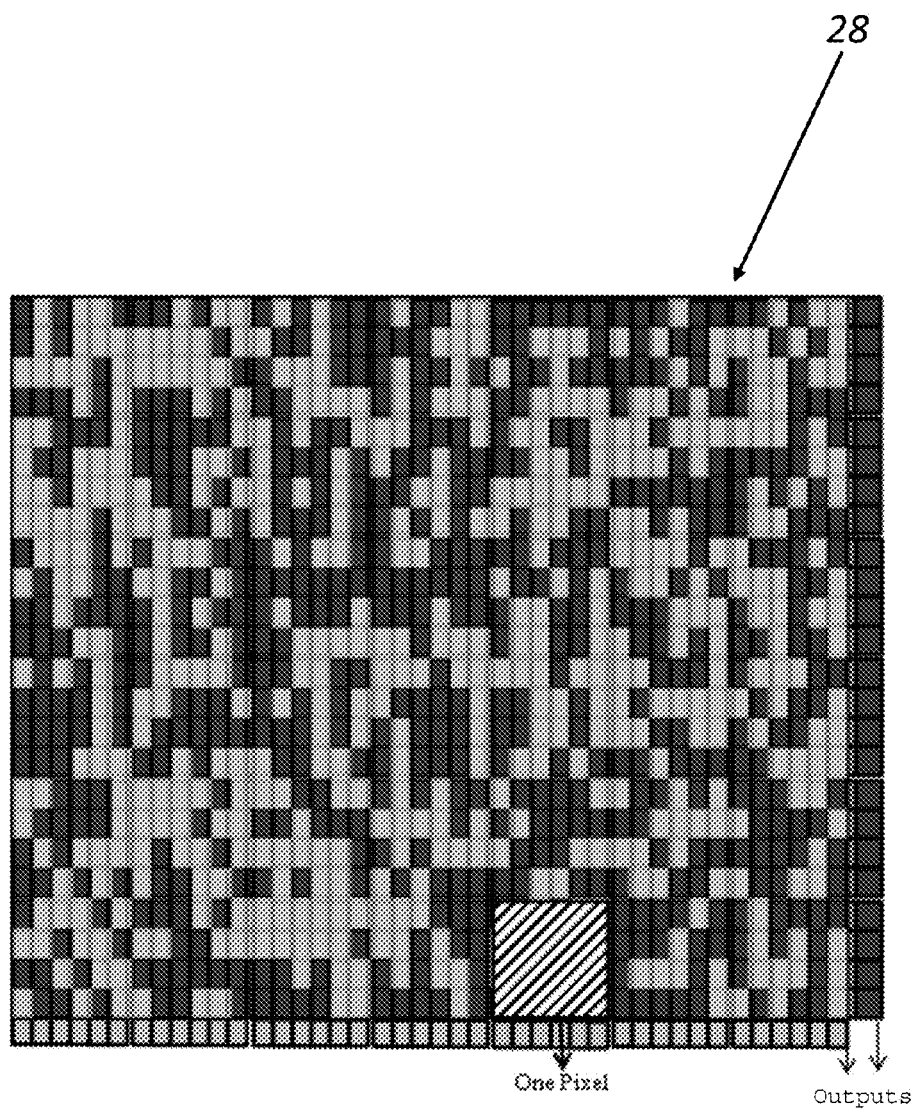
FIG. 3 is a schematic diagram illustrating a grid structure sensor with a 6-horizontal Coded Bundled 4-SODiS and 7-vertical Coded Bundled 6-SODiS, where the pixel resolution is 6×7 and the number of outputs is (6×4+7×6=66), in accordance with the systems and methods of the present disclosure.

$M_h$ Bundled $R_h$-SODiSes 18 are used horizontally and $M_v$ Bundled $R_v$-SODiSes 18 are used vertically. In this configuration, assuming that the length of the Code 20 for each horizontal bundle is $R_h \times M_v$ and for each vertical bundle is $M_h \times R_v$; then the resolution of this configuration is $M_h \times M_v$. The number of outputs is $(M_h \times R_h + M_v \times R_v)$. The height of each pixel 26 is the same as the height of each horizontal bundle and the width of each pixel 26 is the same as the width of each vertical bundle. FIG. 3 illustrates a 6-horizontal Coded Bundled 4-SODiS and 7-vertical Coded Bundled 6-SODiS 28. Therefore the pixel resolution is 6×7 and the number of outputs is (6×4+7×6=66).

Figure 4:
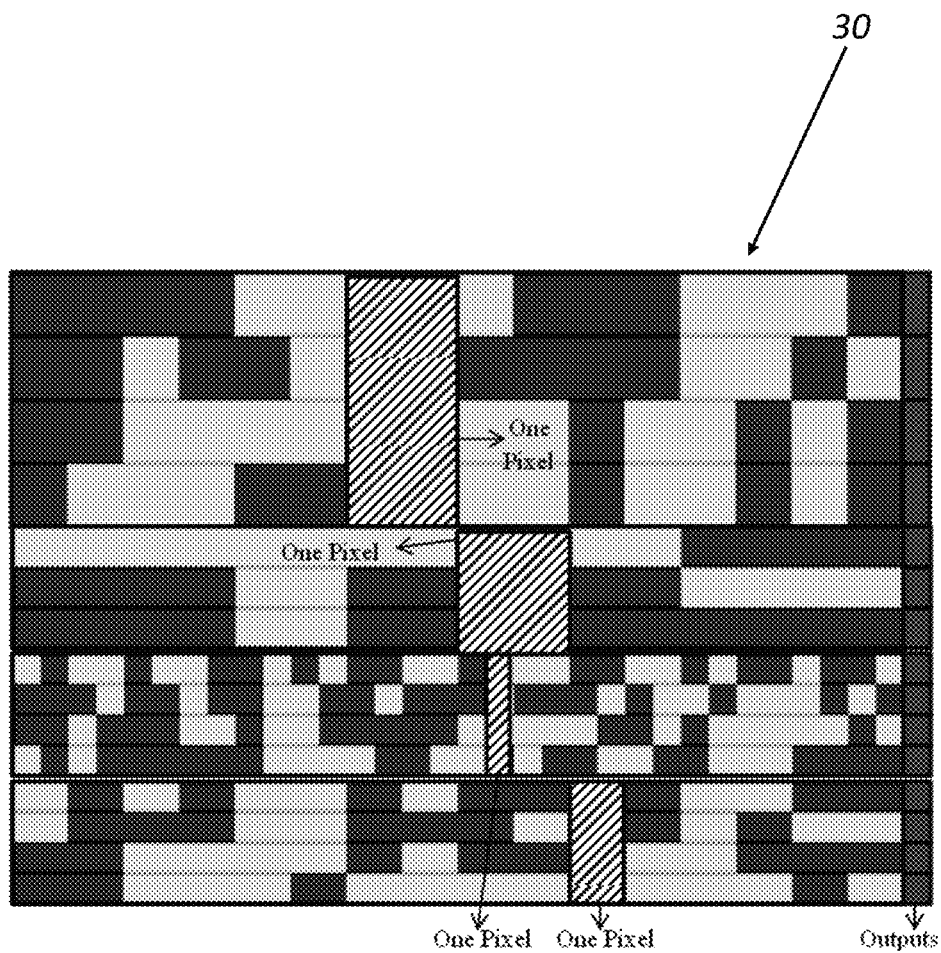
FIG. 4 is a schematic diagram illustrating a grid structure sensor with a different Coded Bundled SODiS and different pixel sizes, in accordance with the systems and methods of the present disclosure.

Bundled SODiSes 18 with different sizes and Codes 20 with different sizes can be used to achieve different pixel sizes. FIG. 4 illustrates such a grid structure sensor 30 with different Coded Bundled SODiSes 22 and different pixel sizes.

Using the configurations of FIGS. 2 and 3, and the combination of horizontal and vertical SODiSes, the number of outputs is $(M_h \times R_h + M_v \times R_v)$ and the number of pixels varies between $M_h \times M_v$ and $M_h \times R_h \times M_v \times R_v$.

For all the exemplary configurations described above, MODiSes can be used instead of SODiSes (e.g., using a MODiS with two outputs), or a combination of SODiSes and MODiSes can be used. The number of outputs then depends on the number of SODiSes and MODiSes that are used and the number of outputs for each MODiS.

Each of above mentioned configurations can be used as one layer of a sensor, and similar or dissimilar layers can be stacked on top of or otherwise combined with one another. In this case, one has to account for the loss of input when parameters of interest interact with the various layers.

Although under ideal conditions the operator (for example, the sum operator) is well defined, in real applications it may not be and one may need to calibrate the system in order to find out the relationship between the output(s) and the input(s) for a specific position of the sensor (i.e., weighted pixels).

The basic idea for obtaining a value for each pixel is based on compressive sampling concepts, theories, and algorithms.

Figure 5:
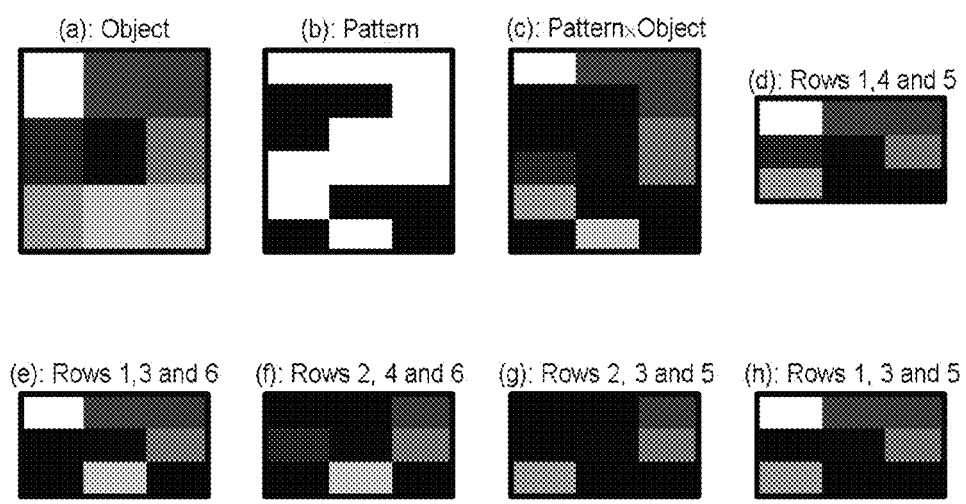
FIG. 5 is a series of schematic diagrams illustrating various object and mask combinations—white shows maximum value (brightest pixel for object and transparent mask for pattern) and black shows minimum value (dark pixel for object and blocking mask for pattern): (a) object; (b) pattern; (c) multiplication of object and pattern that results in a masked object; and (d)-(h) different selections of rows of the masked object, in accordance with the systems and methods of the present disclosure.

Given a Bundled R-SODiS, by choosing one SODiS from each bundle there is one value for each pixel that depends on both the input signal and the corresponding Code. The sum of those values represents the sum of multiplication of the input signal by the Code. Having L sets of these combinations results in L values that correspond to L different Codes. FIG. 5 illustrates an exemplary object with 3×3 pixels. The sensor has 3 Bundled 2-SODiSes. Therefore there are 6 outputs. From each Bundled 2-SODiS one SODiS is chosen. FIGS. 5(d)-5(h) illustrate 5 different such combinations. For each combination, the values of the chosen output are added up. The resultant values and the corresponding Codes are used to construct the object (i.e., signal or image).

Instead of choosing one SODiS from each Bundled R-SODiS, s SODiS(es) from each Bundled R-SODiS can also be chosen, wherein s is between zero and R.

Given $M_h \times R_h$ horizontal SODiSes ($M_h$ Bundles of $R_h$-SODiSes) and $M_v \times R_v$ vertical SODiSes ($M_v$ Bundles of $R_v$-SODiSes), one can choose $s_h$ SODiS(es) from each horizontal bundle and $s_v$ SODiS(es) from each vertical bundle, where $s_h$ and $s_v$ are between zero and the number of SODiSes in each bundle, and add up the corresponding outputs. The resultant values and corresponding codes are used to construct the signal or image.

Again, all mentioned algorithms can be applied to MODiSes by choosing the proper combination of the outputs of the MODiSes.

Outputs of each Bundled R-SODiS or a set of Bundled R-SODiSes can be analyzed independent from other bundles and, therefore, this speeds up the processing time. The algorithm for constructing the distributed signal is different; namely every row (or set of rows) or column (or set of columns) of the distributed signal is reconstructed independently and simultaneously. For parallel processing, parallel parts can be exactly the same.

To achieve a reconstructed distributed signal (for example, an image) with good quality (good signal-to-noise ratio), Codes should be chosen carefully. Preferred Codes have the attribute of randomness; i.e., the correlation between these Codes and any other Codes is minimized. This is important in compressive sampling; since, in order to have a minimum number of samples for reconstruction, one needs to have maximum incoherence between the measurement vectors (i.e., Codes) and the basis of the distributed signal, and it has been demonstrated that random Codes are incoherent to almost all bases.

Here, two exemplary, non-limiting, methods for selecting Codes are provided. One method is to consider a MODiS with one of its outputs as a SODiS. Assume an M-Bundled R-SODiS, each with a R×N Code. The number of outputs is R×M and the pixel resolution is M×N.

First M random Codes are assigned, each with size R×N, to the bundles and define a set of criteria (e.g., randomness or pseudo-randomness properties) for Code combinations that are selected. Then, a first combination is selected for the first Code. For the second Code, after selecting the combination, the two Codes are analyzed with respect to the set of criteria.

If they do not have the criteria, another combination is selected, and this is continued until the criteria are met. For each selected Code combination, the same procedure is carried out for the selected Code combination and all previously selected Code combinations—until the required number of codes have been selected.

Suppose that $\{v_i\}$ shows a family of pseudo-random codes with length N and family size L. Each subset of $\{v_i\}$ and $\{-v_i\}$ with R elements is chosen and assigned to a Bundled R-SO-DiS. Next, each element of $\{v_i\}$ is named as an elementary Code and each Code that corresponds to the selection of M elementary Codes is named as a secondary Code. The length of each secondary code is M×N and there is a value that corresponds to that secondary code that is the sum of the outputs of the corresponding selected SODiSes. To have a good quality reconstructed signal (or image), secondary Codes should be orthogonal.

Suppose a first secondary Code $SC_1=[v_{k_1} v_{k_2} \ldots v_{k_M}]$, where $1 \le k_i \le L$. For the next secondary Code, either for each Bundled R-SODiS one must choose a different elementary Code, or, if the elementary Codes are the same, then one must have another position at which the same elementary Code is used with a different sign. Explicitly, there are R secondary Codes with different elementary Codes at each position. The next step is to add the secondary Codes that contain even numbers of elementary Codes with a negative sign. The family of constructed secondary Codes is an orthogonal family, provided that the family of elementary Codes is orthogonal.

Figure 6:
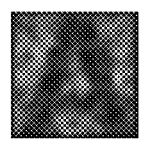
FIG. 6 is a series of schematic diagrams illustrating a simulation of imaging using grid structure sensing, including: (a) object with pixel resolution of 64×64; (b) reconstructed image using 64-Coded Bundled 8-SODiSes using uniform Codes (value of Codes are uniformly distributed between zero and one; (c) reconstructed image using 64-Coded Bundled 8-SODiSes using binary Codes; (d) reconstructed image using 64-Coded Bundled 8-SODiSes using Codes with Gaussian distribution; (e) reconstructed image using 64-Coded Bundled 16-SODiSes using uniform Codes (value of Codes are uniformly distributed between zero and one); (f) reconstructed image using 64-Coded Bundled 16-SODiSes using binary Codes; and (g) reconstructed image using 64-Coded Bundled 16-SODiSes using Codes with Gaussian distribution, in accordance with the systems and methods of the present disclosure.
Figure 6:
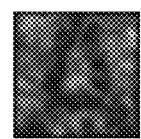
Figure 6:
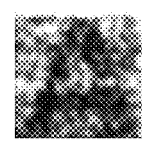
Figure 6:
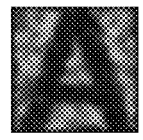
Figure 6:
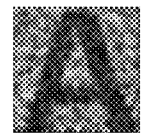
Figure 6:

The proposed technique has been tested in a simulated environment with an image of a capital character 'A' as the object (FIG. 6(a)). The object is 64×64 pixels and Bundled 8-SODiS, Bundled 16-SODiS, and Bundled 32-SODiS were used. The Codes that were used were binary Codes, Codes with uniform distributions between zero and one, Codes with Gaussian distributions, and Hadamard Codes. FIG. 6(b) shows the reconstructed image using 64-Coded Bundled 8-SODiSes, using a uniform Code. FIG. 6(c) shows the reconstructed image using 64-Coded Bundled 8-SODiSes using a binary Code. FIG. 6(d) shows the reconstructed image using 64-Coded Bundled 8-SODiSes using a Gaussian distributed Code. As is seen with Coded Bundled 8-SODiSes, a uniform distributed Code provides better performance.

FIGS. 6(e)-6(g) show the reconstructed image using 64-Coded Bundled 16-SODiSes with a uniform Code, binary Code, and Code with Gaussian distribution, respectively. As is seen, the performance of Codes with Coded Bundled 16-SODiS is almost the same.

Figure 7:
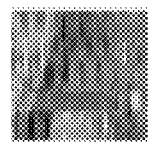
FIG. 7 is a series of schematic diagrams illustrating a simulation of imaging using grid structure sensing and parallel processing, wherein each Coded Bundled R-SODiS is processed independently, including: (a) object with pixel resolution of 64×64; (b) reconstructed image using 64-Coded Bundled 16-SODiSes using Hadamard Codes; and (c) reconstructed image using 64-Coded Bundled 32-SODiSes using Hadamard Codes, in accordance with the systems and methods of the present disclosure.
Figure 7:
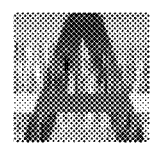

FIG. 7 shows the result of parallel processing for the same object. FIG. 7(b) shows the reconstructed image with Coded Bundled 16-SODiSes and FIG. 7(c) shows the reconstructed image with Coded Bundled 32-SODiSes. As, expected, more SODiSes in a bundle results in better performance.

Figure 8:
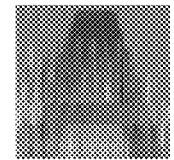
FIG. 8 is a series of schematic diagrams illustrating a simulation of imaging using Bundled R-SODiS and parallel progressive processing, wherein each Coded Bundled R-SODiS is processed independently, including: (a) object with pixel resolution of 128×128; (b) reconstructed image using 128-Coded Bundled 32-SODiSes using Hadamard Codes—at each step, the top SODiS of Bundled 32-SODiS is excluded and the first SODiS from next Bundled 32-SODiS is included; and (c) averaged image using 128-Coded Bundled 32-SODiSes using Hadamard Codes, in accordance with the systems and methods of the present disclosure.
Figure 8:
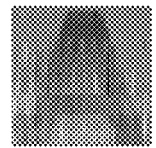
Figure 8:
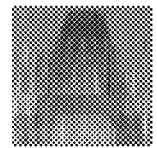
Figure 8:
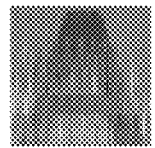
Figure 8:
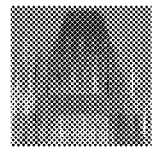
Figure 8:
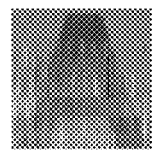
Figure 8:
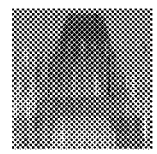
Figure 8:
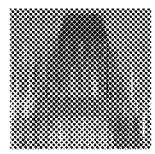
Figure 8:
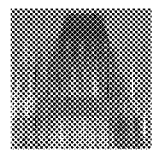

FIG. 8 shows the results of parallel progressive for the object with a pixel resolution of 128×128. FIG. 8(b) shows the reconstructed images using 128-Coded Bundled 32-SODiSes using Hadamard codes; at each step, the top SODiS of the Bundled 32-SODiS is excluded and the first SODiS from the next Bundled 32-SODiS is included. For this simulation, 7 shifts, i.e., seven SODiSes, were used. FIG. 8(c) shows the averaged image. To average 8 reconstructed images, first they are resized to 128×32 rows and 128 columns; then each image is shifted vertically with the same number of rows as before the reconstruction of images with respect to first image (i.e., the second image is shifted one row down, the third image is shifted two rows down, and so on). The final image (FIG. 8(c)) is the average of shifted images.

EXEMPLARY APPLICATIONS

Waveguide-Based Camera

Although the example provided below is for a sensing grid of optical fibers, the concepts of the present disclosure are equally applicable to all waveguides. The waveguides could take various forms, and they do not need to be in horizontal and vertical orientations. Each waveguide could be a straight line or curve in 3 dimensions, represented by a function $f(x,y,z)=0$.

Figure 9:
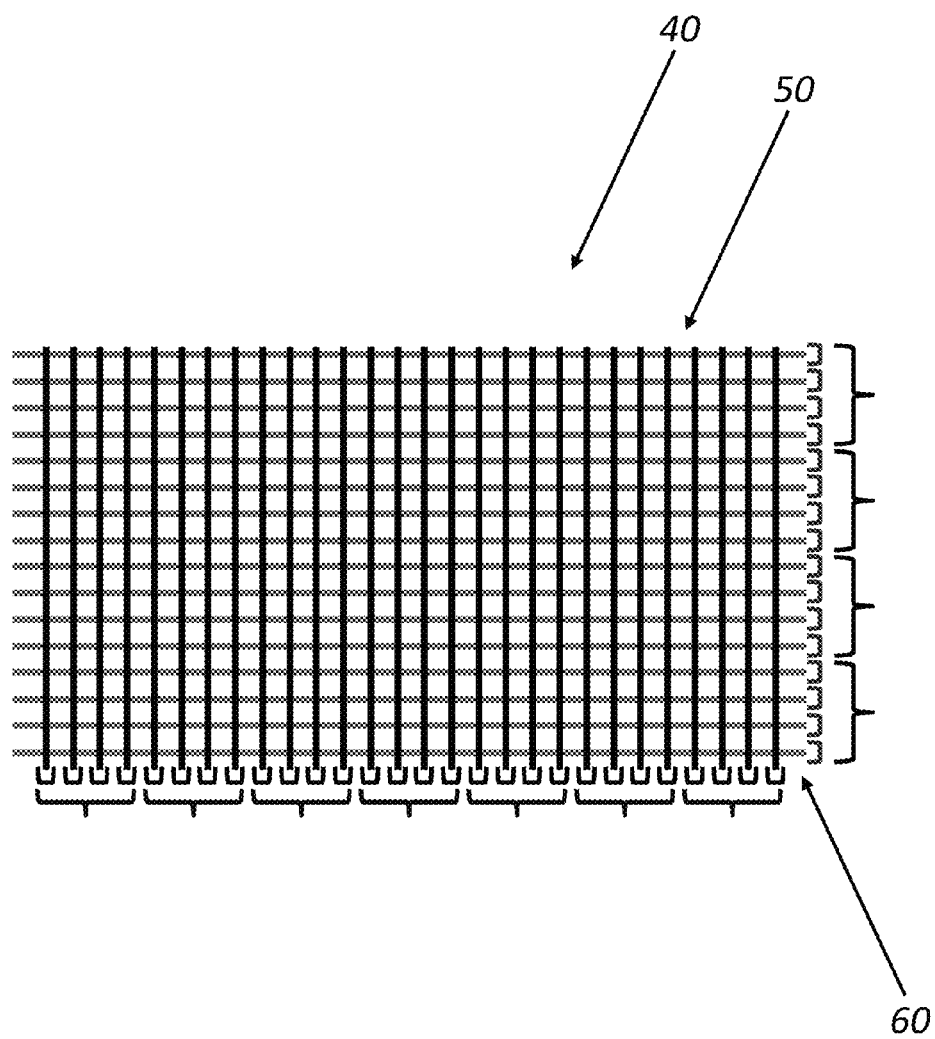
FIG. 9 is a schematic diagram illustrating a cloth made of fluorescent fiber optics, in accordance with the systems and methods of the present disclosure.

A fabric 40 that is made from such optical fibers can be made to function as a camera, for example. Assume that the threads 50 of the fabric 40 are made from fluorescent fiber optics and at the end of each thread there is a detector 60 (FIG. 9). Each optical fiber with its corresponding detector is considered a SODiS (one can also use two detectors and two ends of each optical fiber, such that, in this case, each optical fiber would be considered a MODiS with two outputs).

There are different configurations to acquire an image from this fabric 40. For all configurations, one needs to make sure that the random Code is incorporated into the fabric 40 either by weaving a pattern; i.e., warp and weft yarns needs to cross over each other randomly, or by printing a random pattern on the fabric 40, etc. This can be achieved by providing a regular weave pattern (i.e., not random) and superimposing a Code on the fabric 40. Four exemplary configurations are possible.

Only the output of horizontal lines is used: We divide the horizontal lines in a set of M optical fibers as one row for the image (Bundled M-SODiS). Therefore, if there are M×N optical fibers horizontally, there are N rows in resultant image. The vertical resolution is the same as the number of vertical fiber lines. Since the crossing of horizontal and vertical lines is random, if we choose one row of optical fiber from each set of M optical fibers randomly, for each selection we have a random mask in front of our matrix; namely if the vertical line is over the horizontal line, the corresponding value for the mask will be zero; otherwise it would be one. Different choices for rows at each set of M optical fibers results in different Codes. Therefore, we can use these different Codes and the output of chosen rows along with reconstruction algorithms for compressive sampling to reconstruct the image. The assumption for this reconstruction is that the image is smooth enough such that it is uniform inside a pixel, that its width is the width of one optical fiber, and the height is the height of M optical fibers.

We could achieve the same results by not relying on the weave pattern, but by superimposing (for example, by printing) a pattern on the fabric.

Only the output of vertical yarns is used: We divide the vertical yarns in a set of M optical fibers as one column for the image (Bundled M-SODiS). Therefore, if there are M×N optical fibers vertically, there are N columns in the resultant image. The horizontal resolution is the same as the number of horizontal optical fibers. Since the crossing of vertical and horizontal yarns is random, if we choose one row of optical fiber from each set of M optical fibers randomly, for each selection we have a random mask in front of the pixels of the camera; namely if the horizontal yarn is over the vertical yarn, the corresponding value for mask will be zero; otherwise it would be one. Different choices for columns at each set of M optical fibers results in different random Codes. Therefore, we can use these different Codes and the output of chosen columns and reconstruction algorithms for compressive sampling to reconstruct the image. The assumption for this reconstruction is that the image is smooth enough such that it is uniform inside a pixel, that its width is the width of M optical fibers, and that the height is the height of one optical fiber.

Again, as stated before, we can achieve this by superimposing a pattern, rather than relying on the weave structure.

We use the outputs of both horizontal and vertical optical fibers: If we divide the vertical lines into a set of M optical fibers as one row (Bundled M-SODiS) and N optical fibers as one column (Bundled N-SODiS), then the size of one pixel is equal to width of N optical fibers and the height of M optical fibers. Therefore, in a grid of M×P horizontal optical fibers and NQ vertical optical fibers, the resolution of the resultant image would be P by Q. If we randomly choose one optical fiber from each vertical set and each horizontal set, since the weaving is also random, the result would be a random mask in front of the equivalent P by Q array detector. Therefore, using a set of Codes and a reconstruction algorithm for compressive sampling, we can reconstruct the image. Again, as stated before, we can achieve this by superimposing a pattern rather than relying on the weave structure.

With the same configuration as previous parts, if we do not limit our selection to one fiber optic per set of horizontal or vertical sets, we can still use the resultant Codes and reconstruction algorithms of compressive sampling to reconstruct the object. For example, choosing no SODiS from a Bundled SODiS means that the corresponding Code has zero values for that Bundled SODiS and corresponding pixels. Choosing more than one SODiS means that value of the Code for the corresponding pixels is sum of value of the Codes for chosen SODiSes.

Long Photocells

A photocell with a large ratio of length to width can also be used as a SODiS. Long photocells can be used in horizontal and vertical configurations or free forms. The same configurations as explained in waveguide-based cameras can apply to long photodiodes. Since each SODiS is a photocell, this sensor can simultaneously be used as a solar cell for energy production, for example.

Color Imaging

There are various different exemplary methods to acquire a color image: using a color filter array (like a Bayer filter that is used in color cameras) for acquiring a RGB color image—this color filter should be such that for each SODiS there is only one color and results can be combined by the pattern that is placed in front of the SODiS; using different quantum dots (e.g., in fibers) in different SODiSes—we can separate colors by using different detectors that each is responsive (sensitive) to only one color; using different gratings on top of the waveguides that can only transmit specific ranges of wavelengths corresponding to specific colors; using long photocells, where each is sensitive to one color and arranging them in a proper way to acquire a color image; and using a stack of different layers in which each layer of the sensor is sensitive to one color (i.e., wavelength band).

Radiography

In radiography, x-rays are used to image different parts of the body. The percentage of x-rays that pass through the body are detected by a detector behind the body. The proposed grid sensor can be used as such a detector. Since the x-rays do not need to be focused after passing through body, there is no need for lenses in front of detector.

Embedded Cameras

Since the proposed grid sensor can be flexible and be made from different materials, it can be used as an embedded camera for different applications.

Cloaking

The proposed grid sensor can be made in the form of a cloth. Therefore, it can be used as part of a garment. If we use the proposed sensor as the back of a garment and use the front side of the clothing to project a detected image, this system can be used as a means of cloaking Touch Screens Touch screens sense the position of tactile input. Since the proposed sensor is a distributed sensor, it can be used to sense and locate the places that are touched (e.g., by sensing the change of intensity, pressure, resistance, or capacitance). Therefore the proposed sensor can be used as a multi-touch screen.

Touch-Sensitive Skins

As the name suggests, touch-sensitive skins are sensitive to touch. The proposed sensor has the capability of being sensitive to pressure, light, resistance, etc. Therefore, it can sense multi-touch and be used as a touch-sensitive skin.

Micro-Arrays

Microarrays are 2-D arrays for detecting and evaluating biological materials. Since the proposed sensor has the ability to replace 2-D detectors and flexibility to detect a wide range of parameters, including functionalize parameters, it can be used as a micro-array.

Biomedical Sensors

Biomedical sensors can be implemented using the proposed sensor configuration; different biomedical sensors are implemented in 1-D, 2-D, or 3-D configurations and the outputs are read from sides (edges) of sensor configuration.

Gaming

Game controllers can be implemented using the proposed sensor. Since the proposed sensor is flexible and can sense touch, pressure, and light intensity, it can be used as an embedded touchpad or camera as a means of controlling a game.

Embedded Security System

Security systems use cameras and various sets of sensors to monitor an environment. Since the proposed sensor grid can be implemented in different shapes and with different materials and can sense different parameters, it can be embedded in different systems and environments.

All-Angle (Omni-Directional) Cameras

All angle cameras can capture light from all different angles. The proposed sensor can be flexible and be implemented as camera. Therefore, an all angle camera can be implemented using the proposed sensor.

High-Speed Cameras

There are two ways to use this technique and increase the speed of CMOS cameras: superimpose a Code pattern on the camera and read the data from one edge of the camera matrix similar to what is shown in FIG. 9 or apply a linear Code like $(1, 0, 0, 1, \ldots, 0, 1)$ on each row of the camera pixels and read the corresponding sum of each row such that there will be no need for sub-pixel reading as described previously in FIG. 9.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A distributed sensor system, comprising:
   a distributed sensor array comprising a plurality of sensor units and a plurality of outputs; and a plurality of Codes applied to the plurality of outputs subsequent to a measurand of interest being sensed;
wherein the plurality of Codes are random; and
wherein the plurality of Codes provide a plurality of functions that are read out at the one or more outputs, thereby allowing for sampling of the plurality of sensor units.

2. The distributed sensor system of claim 1, wherein the distributed sensor array comprises one of a linear sensor array, a sensor grid, and a sensor matrix.

3. The distributed sensor system of claim 1, wherein the distributed sensor array makes up one of a sensor surface, a sensor fabric, and a sensor skin.

4. The distributed sensor system of claim 1, wherein the distributed sensor array is manufactured using one of a fiber optic manufacturing technique, a textile fabric manufacturing technique, a photodiode fabrication technique, and a microelectromechanical system manufacturing technique.

5. The distributed sensor system of claim 1, wherein the distributed sensor array comprises one or more Single Output Distributed Sensor(s).

6. The distributed sensor system of claim 1, wherein the distributed sensor array comprises one or more Multiple Output Distributed Sensor(s).

7. The distributed sensor system of claim 1, wherein the plurality of outputs are read one of serially and in parallel.

8. The distributed sensor system of claim 1, wherein each of the plurality of sensor units is one of configured and functionalized to sense a parameter of interest.

9. The distributed sensor system of claim 8, wherein the parameter of interest comprises one or more of light intensity, pressure, strain, electrical signals, temperature, and biologics.

10. A distributed sensor method, comprising:
providing a distributed sensor array comprising a plurality of sensor units and a plurality of outputs; and
applying a plurality of Codes to the plurality of outputs subsequent to a measurand of interest being sensed;
wherein the plurality of Codes are random; and
wherein the plurality of Codes provide a plurality of functions that are read out at the one or more outputs, thereby allowing for sampling of the plurality of sensor units.

11. The distributed sensor method of claim 10, wherein the distributed sensor array comprises one of a linear sensor array, a sensor grid, and a sensor matrix.

12. The distributed sensor method of claim 10, wherein the distributed sensor array makes up one of a sensor surface, a sensor fabric, and a sensor skin.

13. The distributed sensor method of claim 10, wherein the distributed sensor array is manufactured using one of a fiber optic manufacturing technique, a textile fabric manufacturing technique, a photodiode fabrication technique, and a microelectromechanical system manufacturing technique.

14. The distributed sensor method of claim 10, wherein the distributed sensor array comprises one or more Single Output Distributed Sensor(s).

15. The distributed sensor method of claim 10, wherein the distributed sensor array comprises one or more Multiple Output Distributed Sensor(s).

16. The distributed sensor method of claim 10, wherein the plurality of outputs are read one of serially and in parallel.

17. The distributed sensor method of claim 10, wherein each of the plurality of sensor units is one of configured and functionalized to sense a parameter of interest.

18. The distributed sensor method of claim 17, wherein the parameter of interest comprises one or more of light intensity, pressure, strain, electrical signals, temperature, and biologics.

19. A distributed imaging system, comprising:
a distributed sensor array comprising a plurality of sensor units and plurality of outputs, wherein each of the plurality of sensor units is one of configured and functionalized to sense radiation; and
a plurality of Codes applied to the plurality of outputs subsequent to the radiation being sensed;
wherein the plurality of Codes are random; and
wherein the plurality of Codes provide a plurality of functions that are read out at the one or more outputs, thereby allowing for sampling of the plurality of sensor units.

20. The distributed sensor system of claim 19, wherein the radiation comprises visible radiation.

* * * * *